P. D. BECKWITH.
Grain-Drill.
No. 64,274. Patented Apr. 30, 1867.
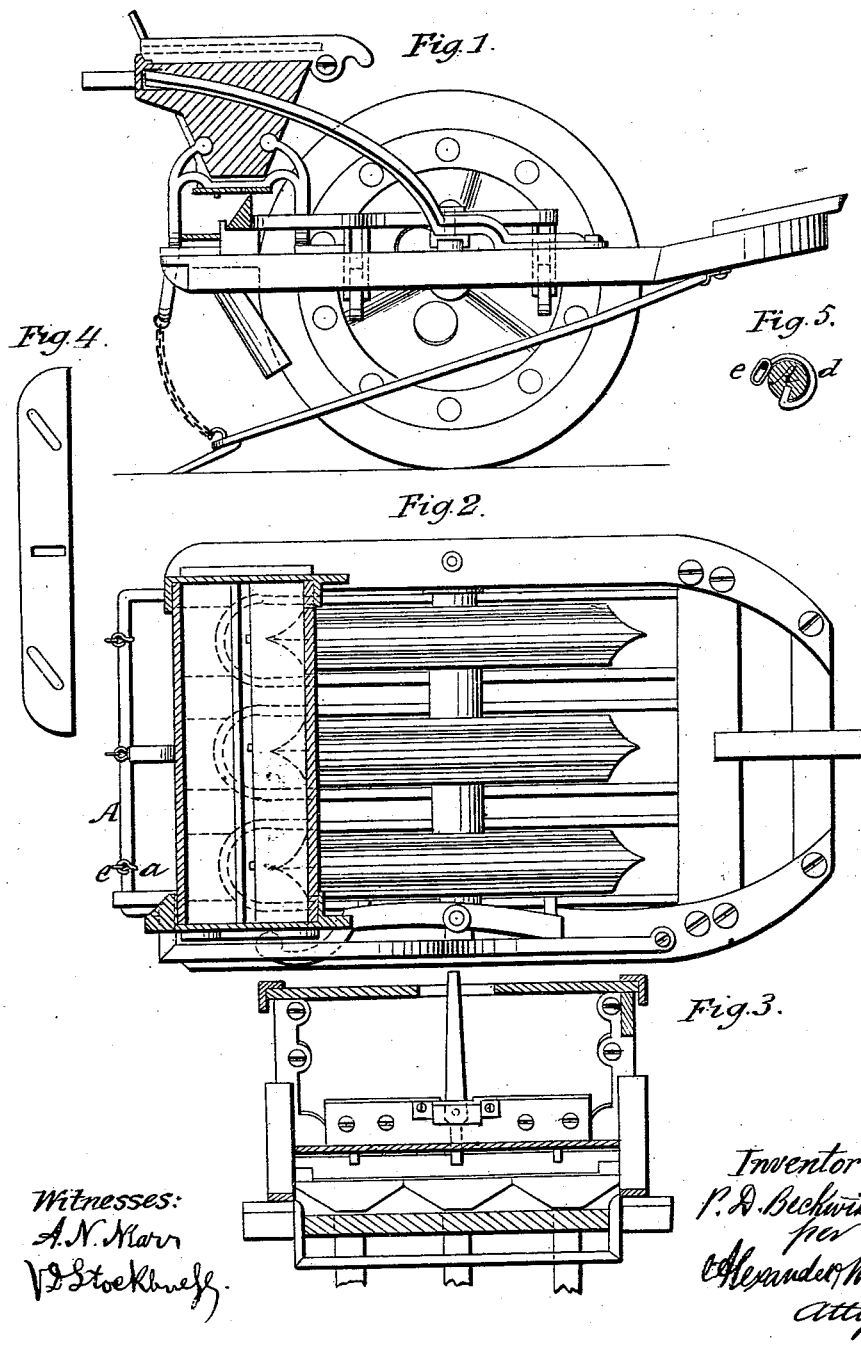

United States Patent Office.

P. D. BECKWITH, OF DOWAGIAC, MICHIGAN.

Letters Patent No. 64,274, dated April 30, 1867.

IMPROVEMENT IN GRAIN-DRILLS.

The Schedule referred to in these Letters Patent and making part of the same.

TO ALL WHOM IT MAY CONCERN:

Be it known that I, P. D. BECKWITH, of Dowagiac, in the county of Cass, and in the State of Michigan, have invented new and useful Improvements in Grain-Drills; and do hereby declare that the following is a full, clear, and exact description thereof, reference being had to the accompanying drawings, and to the letters of reference marked thereon.

The nature of my invention relates particularly in this case to the mode of attaching the chains which raise and lower the coverers or hoes to the bail, which operates all of the chains simultaneously, said bail lying crosswise of and at rear of the frame of the machine.

This bail is made of seven-eighths ($\frac{7}{8}$) bar iron, and has a hole or holes drilled into it from its under side (when hanging down) one-quarter ($\frac{1}{4}$) of an inch deep. I take a rod of iron, insert one end in the hole in the bail, and then bend said rod so as to fit snugly against and partially around the bail, as seen in Figure 5, forming a loop in the outer end, which receives the chain link $e$. The chain being on one side, and the rod $d$ on the other side of the bail, it will be seen that when the bail is turned up the chain is partially wrapped around the said bail, and binds the rod $d$ closely and firmly to it. This mode of attaching the chains to the bail is simple and cheap, and does not materially weaken the strength of said bail.

Having thus fully described my invention, what I claim as new, and desire to secure by Letters Patent, is—

The mode herein described of securing or attaching the chain to the bail A by means of the rod or hook $d$, whereby a simple and permanent attachment is effected without weakining the bail, substantially as specified.

In testimony that I claim the foregoing, I have hereunto set my hand this 28th day of February, 1867.

P. D. BECKWITH.

Witnesses:
   A. R. PARK,
   N. B. HOLLISTER.